United States Patent [19]
Owada et al.

[11] Patent Number: 5,298,986
[45] Date of Patent: Mar. 29, 1994

[54] VIDEO PROJECTION APPARATUS

[75] Inventors: Mitsuru Owada, Kanagawa; Mizuho Tajima, Tokyo; Yoshitake Nagashima, Kanagawa, all of Japan

[73] Assignee: Canon Kabushiki Kaisha, Tokyo, Japan

[21] Appl. No.: 13,242

[22] Filed: Feb. 3, 1993

Related U.S. Application Data

[60] Continuation of Ser. No. 752,202, Aug. 21, 1991, abandoned, which is a continuation of Ser. No. 637,804, Jan. 7, 1991, abandoned, which is a division of Ser. No. 147,519, Jan. 25, 1988, Pat. No. 4,989,076.

[30] Foreign Application Priority Data

Jan. 27, 1987 [JP] Japan ............................. 62-015291
Jan. 27, 1987 [JP] Japan ............................. 62-017830
Jan. 27, 1987 [JP] Japan ............................. 62-017831

[51] Int. Cl.$^5$ ............................................. H04N 9/31
[52] U.S. Cl. ............................ 348/762; 348/767; 353/31; 359/238; 359/246; 359/250; 359/634; 359/891
[58] Field of Search .................. 358/60, 61, 232, 236; 340/784; 353/31, 34; 359/238, 246, 250, 634, 891; H04N 9/31

[56] References Cited

U.S. PATENT DOCUMENTS

| | | | |
|---|---|---|---|
| 4,127,322 | 11/1978 | Jacobson | 358/61 |
| 4,191,456 | 3/1980 | Hong | 358/61 |
| 4,425,028 | 1/1984 | Gagnon | 358/61 |
| 4,560,999 | 12/1985 | Tokuhara | 346/160 |
| 4,755,869 | 7/1988 | Tanaka | 358/60 |
| 4,786,146 | 11/1988 | Ledebuhr | 350/331 R |
| 4,796,978 | 1/1989 | Tanaka | 350/337 |
| 4,864,390 | 9/1989 | McKenchnie | 358/60 |

FOREIGN PATENT DOCUMENTS 61-90584 5/1986 Japan ............................. 358/232

Primary Examiner—Howard W. Britton
Attorney, Agent, or Firm—Fitzpatrick, Cella, Harper & Scinto

[57] ABSTRACT

An apparatus receptive of illumination light from an illumination light source for providing a color image on a projection lens includes three displays responsive to a video signal for modulating incident lights to display respective component images, a first dichroic layer for separating the illumination light into a first component light and a first mixed light of different wavelength regions to give the first component light to one of the displays, a second dichroic layer for separating the mixed light into second and third component lights of different wavelength regions to give the second and third component lights to other two of the displays respectively, a third dichroic layer for synthesizing, out of the first, second and third information lights from the displays, the first and second information light, and a fourth dichroic layer for further synthesizing the light synthesized by the third dichroic layer with the third information light.

39 Claims, 4 Drawing Sheets

VIDEO PROJECTION APPARATUS

This application is a continuation of application Ser. No. 07/752,202, filed Aug. 21, 1991, now abandoned, which is a continuation of application Ser. No. 07/637,804, filed Jan. 7, 1991, now abandoned, which is a divisional application of Ser. No. 07/147,519, filed Jan. 25, 1988, issued as U.S. Pat. No. 4,989,076, on Jan. 29, 1991.

BACKGROUND OF THE INVENTION

1. Field of the Invention

This invention relates to a liquid crystal display (hereinafter abbreviated to LCD) projection apparatus in which a video signal formed from the entering white light is separated into chrominance components of three primary colors, and then the components after having been modulated by using respective monochrome video image display devices such as LCD ones are synthesized again to permit projection of an image in full color.

2. Description of the Related Art

Recently, television sets of the projection type have rapidly come into such wide use that they can be seen not only in the public facilities but also in home. This kind of apparatus uses three high-luminance cathode ray tubes in which are made up color component images corresponding to the respective color component lights of red (R), green (G) and blue (B) and these images are projected by projection lenses onto a screen where they are synthesized to display a picture of the original color. FIG. 1 shows the outline of the video projection apparatus. 1, 2 and 3 are cathode ray tubes corresponding to the color components R, G and B respectively and are driven by drive circuits 4, 5 and 6 for R, G and B into which the video signals of the color components R, G, B enter respectively. 7, 8 and 9 are projection lenses, and are each arranged in focus on a screen 10 in front of the cathode ray tubes 7, 8 and 9. Note, in this figure, the projection lens is shown by a single lens, but in actual practice is usually constructed with a plurality of lenses for correction of various aberrations.

However, such an apparatus increases in size, and, when the distance to the screen is changed, re-adjustment is required so that the three monochrome projected images overlap one another on the screen.

Therefore, as an arrangement for the possibility of projecting by one projection lens P, what is shown in FIG. 2 is considered. In the figure, S is an illumination light source issuing white light, for example, for use in the Koehler illumination system. As means for separating parallel entering light A which is white light into three primary colors, use is made of dichroic mirrors 11 and 12 having two dichroic layers of different wavelength regions crossed to each other. For example, the dichroic mirror 11 reflects the blue color component B, and the dichroic mirror 12 reflects the red color component R. Of the three color components R, G and B separated by this crossed dichroic mirrors 11 and 12, the color component R is reflected by total reflection mirrors 13 and 14, the color component G goes straight as it is, and the color component B is reflected by total reflection mirror 15 and 16, entering LCDs 17, 18 and 19 corresponding to the respective ones. Because in the LCDs 17, 18 and 19, pictures of each color component of red, green and blue are imaged out, when light permeates here, the variation of transmittance due to the pictures of each of the LCDs 17, 18 and 19 is modulated to the variation of intensity of light.

That is, in FIG. 2, color components R, G and B of red, green and blue are modulated by the video signals of the LCDs 17, 18 and 19, respectively, becoming color components (color information light) R', G' and B'. These lights are synthesized again by a dichroic prism 20 to produce an exiting light A'. Note, the exiting light A' is, as known in the art, projected by the projection lens P onto the screen. On the screen, a picture of full color comes out. In such a manner, in the prior known apparatus, the two dichroic mirrors 11 and 12 are used in the crossed state. Therefore, a portion of the reflection surface of one dichroic mirror 11 is stripped off, giving a drawback that the picture is partly broken down. For example, in FIG. 3, on assumption that the dichroic mirrors 11 and 12 cross each other at right angles, the relationship between the thickness t of the dichroic mirror and the size t' of the broken portion of the reflection surface is expressed by the following equation:

$$t' = t/2^{0.5} \ldots \quad (1)$$

The value of t' of this equation (1) cannot be ignored, and a problem arises that by that portion alone, the center of, for example, the blue is broken down to a stripe shape. Also, the dichroic prism 20 used for synthesizing the modulated color components in FIG. 2 is very high in price, and its weight is also large, being unsuited to be used in home. Further, the optical path from the entering light A to the exiting light A' differs from color component to component. Therefore, the problem of aberration etc. also is large.

SUMMARY OF THE INVENTION

An object of the invention is to provide a projection apparatus in which, by improving such drawbacks of the conventional example, it is made possible that only the dichroic mirrors even separate and synthesize light, and particularly by using such an arrangement that the dichroic mirrors do not cross each other, the problem of the image fracture is eliminated, and, moreover, the optical paths of all the color components can be equalized to each other.

DETAILED DESCRIPTION OF THE PREFERRED EMBODIMENTS

Figure 1:
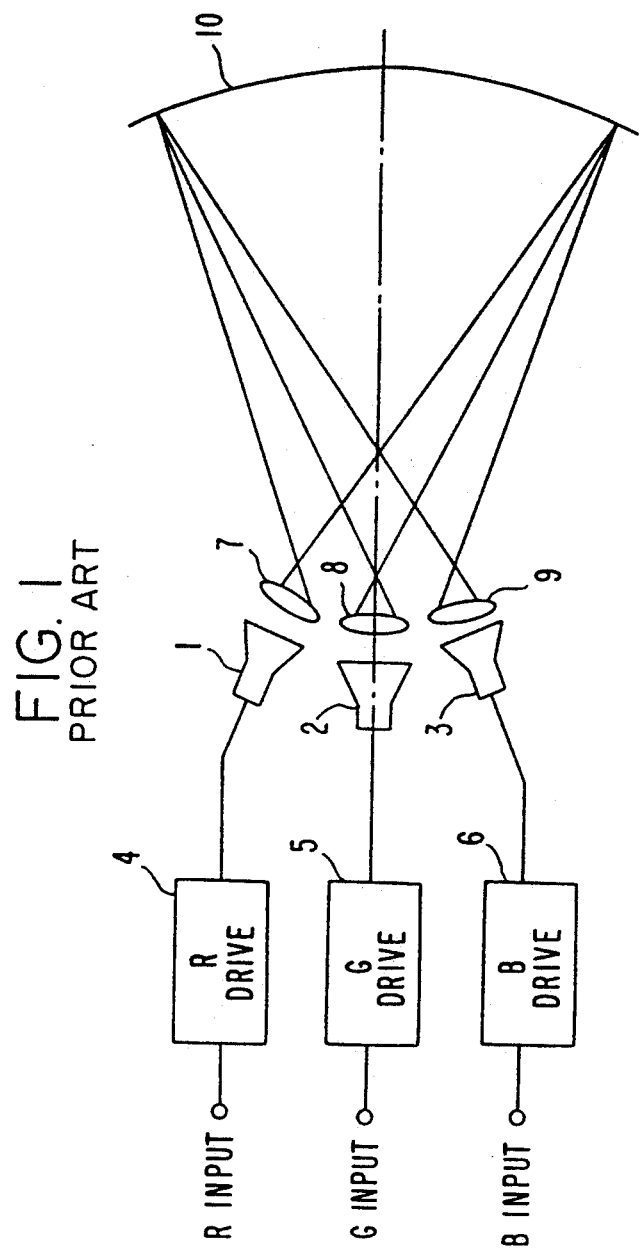
FIG. 1 is a diagram of arrangement illustrating a conventional example.
Figure 2:
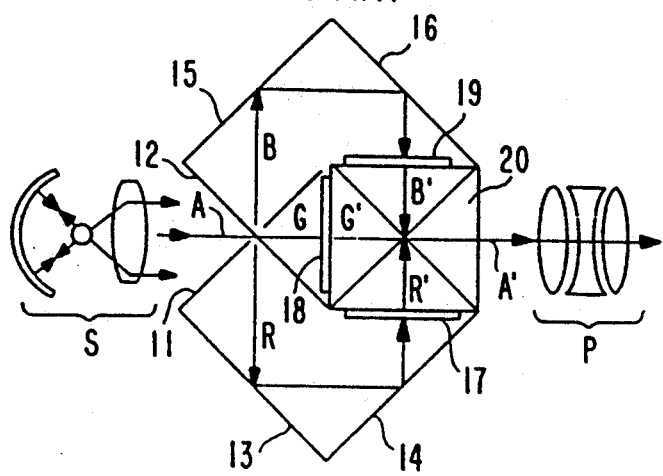
FIG. 2 is an optical section view of a projection apparatus.
Figure 3:
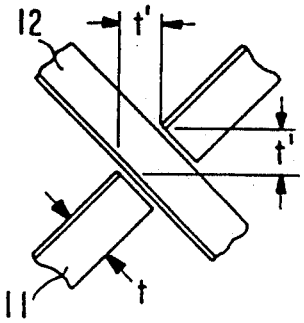
FIG. 3 is a view in enlarged scale of a portion of FIG. 2.
Figure 4:
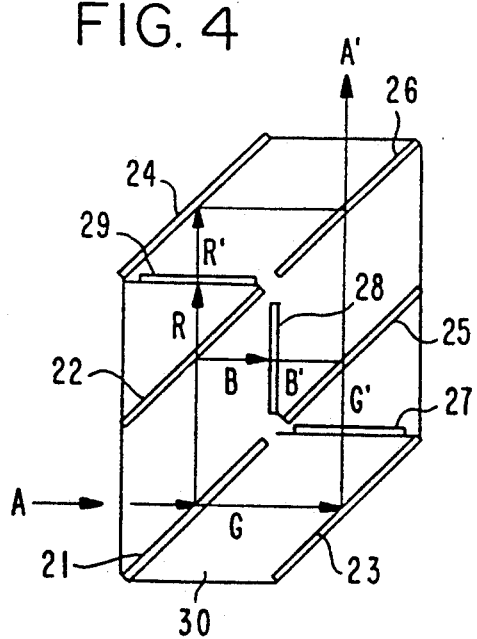
FIG. 4 is an optical section view illustrating an embodiment of the invention.

The present invention is described in detail on the basis of an embodiment shown in FIG. 4. In the figure, the illustration of the illumination light source S and the projection lens P is omitted.

In FIG. 4, 21 is a first dichroic mirror for spectral light separation reflecting, for example, red and blue color components R and B. A second dichroic mirror 22 for spectral light separation separates such reflected color components R and B. As the second dichroic mirror 22, use is made of the property of reflecting the blue color component B. The first and second dichroic mirrors 21 and 22 for spectral light separation are arranged parallel in a direction of 45° with the incident light A. On both sides of the dichroic mirrors 21 and 22 for spectral light separation are arranged total reflection mirrors 23 and 24 in parallel with the dichroic mirrors 21 and 22. Also, in the directions of prolongation of the first and second dichroic mirrors 21 and 22 for spectral light separation, there are arranged respectively a first dichroic mirror 25 for synthesis to reflect the blue color component B and a second dichroic mirror 26 for synthesis to reflect the red color component R. An LCD 27 is arranged between the total reflection mirror 23 and the first synthesizing dichroic mirror 25 in a direction parallel to the incident light A, and another LCD 28 is arranged between the first and second spectral separation dichroic mirrors 21 and 22 in a direction perpendicular to the incident light A. Yet another LCD 29 is arranged between the second spectral separation dichroic mirror 22 and the total reflection mirror 24 in a direction parallel to the incident light A. 30 is a framework supporting each constituent part.

The incident light A impinges on the first spectral separation dichroic mirror 21. The green color component G passed here is reflected by the total reflection mirror 23 and then enters the LCD 27. The blue color component B reflected from the first spectral separation dichroic mirror 21 and then from the second spectral separation dichroic mirror 22 enters the LCD 28, and the red color component R passed through the second spectral separation dichroic mirror 22 enters the LCD 29. The LCDs 27, 28 and 29 have images corresponding to the green, blue and red color components G, B and R, respectively. These images depend on the variations of transmittance of the LCDs 27, 28 and 29, and the respective color components G, B and R are modulated to the variation of intensity of light, becoming color components (color information light) G', B' and R'. These modulated color components G', B' and R' are synthesized again and projected as an exiting light A' of full color on the screen. Therefore, all the color components have the same optical length.

In the illustrated case, the green color component G' modulated by the LCD 27 is produced through the first and second synthesizing dichroic mirrors 25 and 26. Also, the blue color component B' modulated by the LCD 28 is reflected by the first synthesizing dichroic mirror 25 to combine with the green color component G'. Further, the red color component R' modulated by the LCD 29 after having been reflected from the total reflection mirror 24 is reflected by the second synthesizing dichroic mirror 26 where it is combined with the green and blue color components G' and B' to become the exiting light A'.

Figure 5:
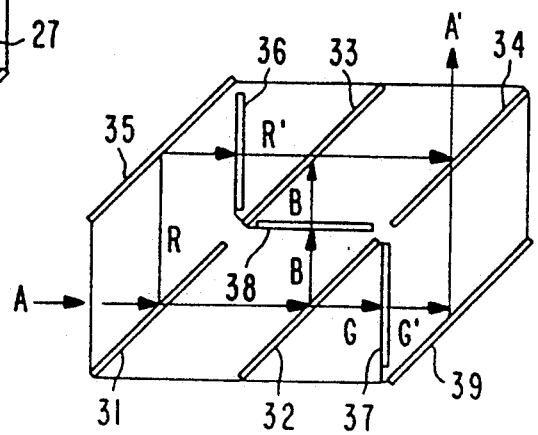
FIG. 5 is a optical section view illustrating another embodiment.

In the second embodiment shown in FIG. 5, the first and second spectral separation dichroic mirrors 31 and 32 are superimposed in a direction of 45 degrees with the incident light A. On the prolongation of these are arranged the synthesizing dichroic mirrors 33 and 34. In the first spectral separation dichroic mirror 31, one reflecting the red color component R is used. Further, as the second spectral separation dichroic mirror 32 for separating the green and blue color components passed through the first spectral separation dichroic mirror 31, use is made of one reflecting the blue color component B. The red color component R enters the LCD 36 passed the total reflection mirror 35, and the green and blue color components G and B separated by the spectral separation dichroic mirror 32 enter the LCDs 37 and 38 respectively. Also, in the first synthesizing dichroic mirror 33 for synthesizing the color components R' and B' modulated by the LCDs 36 and 38, one having the property of reflecting blue is used. Further, in the second synthesizing dichroic mirror 34 for synthesizing the green color component G', one having the property of reflecting the red and blue color components is used. Note, the green color component G' modulated by the LCD 37 is reflected from the total reflection mirror 39 and then passes through the second synthesizing dichroic mirror 34 and then, as has been described above, is synthesized with the color components R' and B' to become the exiting light A' of full color.

In each embodiment described above, for example, the red and blue optical paths may be reversed. In this case, if each dichroic mirror and LCD are so properly chosen as to suit the respective color components, various combinations are possible.

Figure 6:
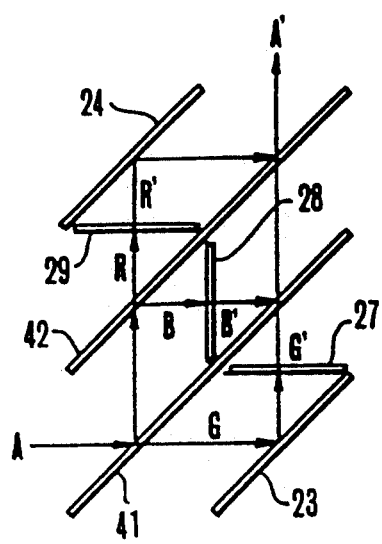
FIG. 6 is an optical section view illustrating an example of variation of the embodiment of FIG. 4.

FIG. 6 shows the structure of another LCD projection apparatus. Here, a first composite dichroic mirror 41 is obtained by unifying the first spectral separation dichroic mirror 21 and the first synthesizing dichroic mirror 25 which position themselves in the same plane in FIG. 4, and a second composite dichroic mirror 42 is obtained by unifying the second spectral separation dichroic mirror 22 and the second synthesizing dichroic mirror 26 which position themselves in the same plane in FIG. 4 are used. All the other constituent elements are like those of FIG. 4, and are denoted by the same reference characters.

Figure 7:
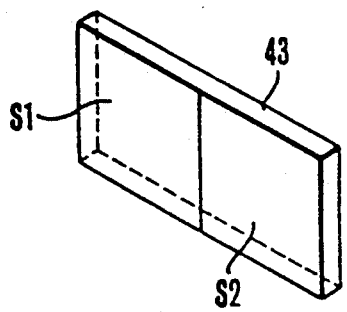
FIG. 7 is a perspective view illustrating one constituent part.
Figure 8:
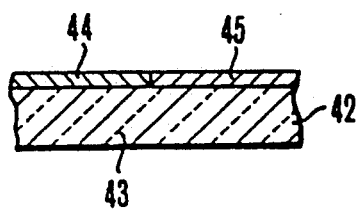
FIG. 8 and FIG. 9 are respectively enlarged views of the main parts.
Figure 9:
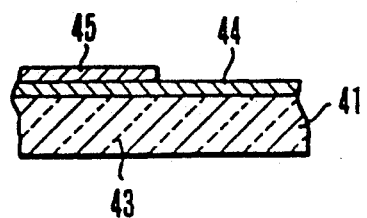

The first and second composite dichroic mirrors 41 and 42 are, for example, as shown in FIG. 7, formed on a common glass substrate 43 in separation at the left-hand half S1 and the right-hand half S2 with coatings of different properties from each other. For example, in the case of the second composite dichroic mirror 42, as shown in FIG. 8, a reflection coating 44 for reflecting a blue component is applied on the left half on the common glass substrate 43, and a reflection coating 45 for reflecting a red component on the right half so that the left half constitutes a dichroic mirror which reflects blue, and the right half another dichroic mirror which reflects red. Also, in the case of the first composite dichroic mirror 41, as shown in FIG. 9, after the coating 44 for reflecting blue has been applied over the entire area of the glass substrate 43, then the coating 45 for reflecting red is applied only to the left half in superimposed relation. Thus, a dichroic mirror which reflects blue is formed in the right half, and another dichroic mirror which reflects blue and red is formed in the left half.

In other words, the first composite dichroic mirror 41 has both functions of the first spectral separation and the first synthesizing dichroic mirrors 21 and 25 of FIG. 4, and the second composite dichroic mirror 42 has both functions of the second spectral separation and the second synthesizing dichroic mirrors 22 and 26 of FIG. 4. Therefore, the operational principle becomes the same as that of FIG. 4.

That is even in FIG. 6, the incident light A on the left half of the first composite dichroic mirror 41 reflects the red color component R and the blue color component B, while the green color component G goes straight as it is and enters the LCD 27 through the total reflection mirror 23. Also, of the red and blue color components reflected by the left half of the first composite dichroic mirror 41, the blue color component B is reflected by the left half of the second composite dichroic mirror 42 and enters the LCD 28. The red color component R goes straight as it is and enters the LCD 29. Of the entering and modulated color components G', B' and R' which enter into and by the LCDs 27, 28 and are modulated 29, the color component G' passes through the right half of the first composite dichroic mirror 41, and the right half of the second composite dichroic mirror 42. When passing through the first composite dichroic mirror 41, it is synthesized with the blue color component B', and further when passing through the second composite dichroic mirror 42, it is synthesized with the red color component R' coming from the total reflection mirror 24. The three color components G', B' and R' are synthesized to become an exiting light A' of full color which is then projected by the projection lens 30 onto the screen.

In the above-described embodiment, the characteristics concerning red and blue of the dichroic mirror may be exchanged by each other, of course.

As has been described above, in the LCD projection apparatus according to this embodiment, whilst in the embodiment of FIG. 4, the necessary number of dichroic mirrors of high price is 4, only two can suffice. Therefore, the cost can largely be cut down. Also, when assembling, because the only necessary operation is to adjust the position of the two dichroic mirrors, the adjustment is easy and the number of steps in the assembling process can be reduced. Further, because of the decrease of the positioning factor, there is another advantage that the quality is stable and the difference of the items can be lessened.

Figure 10:
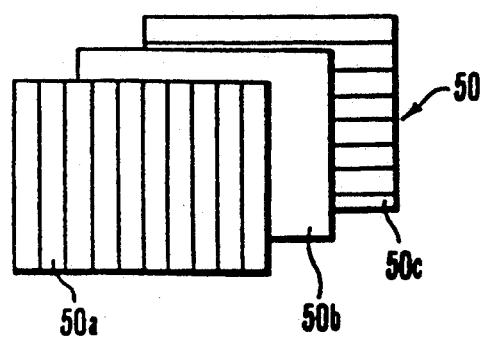
FIG. 10 is an exploded perspective view of a liquid crystal display device.

By the way, the liquid crystal display 50 is constructed, as shown in FIG. 10, from a polarizer 50a, a liquid crystal layer 50b and an analyzer 50c. At the polarizer 50a, only the vertical component (linearly polarized light) of the incident white light is permitted to pass through, while the parallel component is absorbed or reflected. This vertical component is rotated 90° in passing through the liquid crystal layer 50b so that it can pass through the analyzer 50c orthogonal to the polarizer 50a. About a half of the white light after having been modulated by the liquid crystal display 50 is projected onto a screen (not shown), but the remaining half is shut out by the polarizer 50a. Hence it is impossible to set the efficiency of light utilization at higher than 50%.

Figure 11:
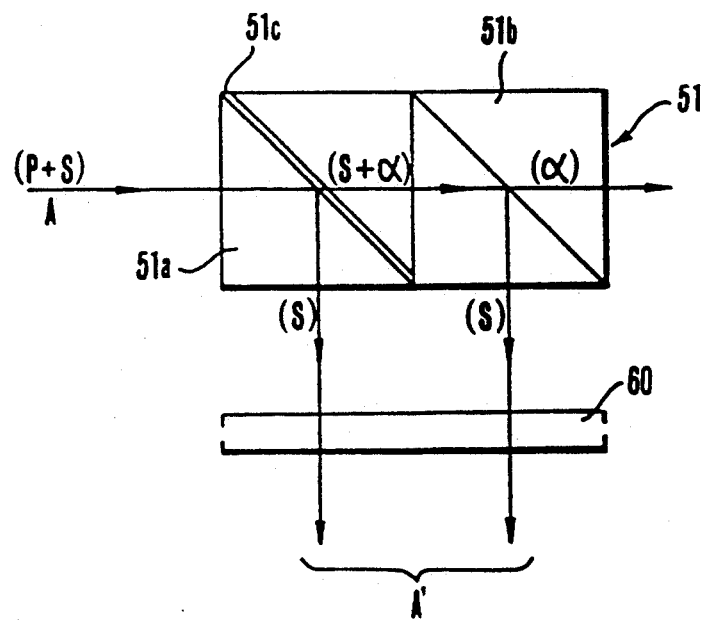
FIG. 11 is a diagram illustrating an example of an illumination device.

FIG. 11 shows an example of an illumination system free from the above-described loss of light amount. 60 is assumed to be the assembly shown in FIG. 4 or FIG. 5, except that the liquid crystal display of this case does not have the polarizer in front of the liquid crystal layer.

51 is a light polarizing assembly which converts white light A from a light source to a linearly polarized light to be used in the color separation-synthesizing assembly 60. This light polarizing assembly 51 is formed from polarizing beam splitters 51a and 51b and a TN (twist nematic) liquid crystal 51c of 90° rotation directly installed in the prism boundary face of the polarizing beam splitter 51a.

In the arrangement described above, the white light A is entered through a condenser lens (not shown) to the polarizing beam splitter 51a, the vertical component S of the white light is reflected by its prism boundary face to enter the color separation-synthesizing assembly 60. Meanwhile, the parallel component P of the white light passes through the prism boundary face, but becomes vertically polarized light by the TN liquid crystal 51c of 90° rotation which constitutes part of the multi-layer coating on the prism boundary face of the polarizing beam splitter 51a. The thus-converted vertical component S is reflected by the next polarizing beam splitter 51b, while a component α generated due to the defect etc. of the TN liquid crystal 51c passes therethrough as it is. This reflected vertical component S is entered into the color separation-synthesizing assembly 60 like the vertical component S reflected by the polarizing beam splitter 51a. Hence, nearly 100% of the incident light is transmitted out of the device. Thus, the efficiency of use of the light rises.

What is claimed is:

1. A light modulating device, comprising:
   a radiation source for emitting light;
   a polarization optical system which splits the light from said radiation source into first and second light beams having their respective planes of polarization mutually crossing at right angles, aligns the planes of polarization of the first and second light beams, and directs the first and second light beams into first and second optical paths substantially parallel to each other; and
   a light modulator arranged to cross the first and second optical paths to modulate the intensity of the first and second light beams, wherein said light modulator includes a liquid crystal device.

2. A device according to claim 1, wherein said optical system converts the light from said radiation source and splits the light into the first and second light beams.

3. A device according to claim 1, wherein said optical system comprises:
   a polarization beam splitter which transmits part of the light from said radiation source to form the first light beam, and directs the remaining part of the light from said radiation source to the second optical path to be reflected to form the second light beam; and
   a mirror which bends the optical path of the first light beam and directs the first light beam to the first optical path, and a polarization plane rotator which rotates the plane of polarization of the first light beam to coincide with the plane of polarization of the second light beam.

4. A device according to claim 3, wherein said rotator includes a ½ wavelength plate.

5. A device according to claim 4, wherein said ½ wavelength plate is located between said polarization beam splitter and said mirror.

6. A light modulating device, comprising:
   a radiation source for emitting light;
   a polarization optical system having a light splitting portion for splitting the light from said radiation source into first and second light beams having their respective polarization planes mutually crossing at right angles, and a polarization plane rotating portion in contact with said light splitting portion to rotate the polarization plane of the first light beam to align with the polarization plane of the second beam; and a light modulator which modulates the intensity of the first and second light beams emitted from said radiation source.

7. A device according to claim 6, wherein said light modulator includes a liquid crystal device.

8. A device according to claim 7, wherein said optical system comprises:

a polarization beam splitter which transmits part of the light from said radiation source to form the first light beam and directs the remaining part of the light from said radiation source to the second optical path and reflects it to form the second light beam; and a mirror which bends the optical path of the first light beam to direct it to the first optical path, and a ½ wavelength plate arranged adjacent to said polarization beam splitter to rotate a polarization plane of the first light beam to coincide with a polarization plane of the second light beam.

9. A device according to claim 8, wherein said ½ wavelength plate is formed on a light splitting surface of said polarization beam splitter.

10. A projector, comprising:

a radiation source for emitting light;

a polarization optical system which splits the light from said radiation source into first and second light beams having their respective planes of polarization mutually crossing at right angles, aligns the planes of polarization of the first and second light beams, and directs the first and second light beams into first and second optical paths substantially parallel to each other;

a generator arranged to cross the first and second optical paths to modulate the first and second light beams and generate a picture image, wherein said generator includes a liquid crystal device having a plurality of picture elements; and a projection optical system which projects the picture image.

11. A projector according to claim 10, wherein said optical system converts the light from said radiation source into parallel light and then divides the parallel light into the first and second light beams.

12. A projector according to claim 10, wherein said optical system comprises:

a polarization beam splitter which transmits part of the light from said radiation source to form the first light beam, and directs the remaining part of the light from said radiation source to be reflected and form the second light beam;

a mirror which bends an optical path of the first light beam to direct the beam to the first optical path; and a polarization plane rotator which rotates a polarization plane of the first light beam to coincide with the polarization plane of the second light beam.

13. A projector according to claim 12, wherein said rotator is a ½ wavelength plate.

14. A projector according to claim 13, wherein said ½ wavelength plate is located between said polarization beam splitter and said mirror.

15. A projector according to claim 13, wherein said optical system includes a color decomposing system located in a main optical path composed of the first and second optical paths, said color decomposing system dividing the first and second light beams into red light, green light and blue light, and said generator including a first liquid crystal device which modulates the red light to generate a red picture image, a second liquid crystal device which modulates the green light to generate a green picture image and a third liquid crystal device which modulates the blue light to generate a blue picture image; and said projection optical system receives the red, green and blue lights from said generator to project a red picture image, a green picture image and a blue picture image.

16. A projector, comprising:

a radiation source for emitting light;

a polarization optical system having a light splitting portion which splits the light from said radiation source into first and second light beams having their respective polarization planes mutually crossing each other at right angles, and a polarization plane rotating portion in contact with said light splitting portion to rotate the polarization plane of the first light beam and align the polarization of the first light beam with the polarization plane of the second light beam;

a generator which modulates the first and second light beams from said radiation source to generate a picture image; and a projection optical system which projects the picture image.

17. A projector according to claim 16, wherein said generator includes a liquid crystal device having a plurality of picture elements.

18. A projector according to claim 16, wherein said optical system comprises:

a polarization beam splitter which transmits part of the light from said radiation source to form the first light beam, and directs the remaining part of the light to the second optical path and reflects it to form the second light beam;

a mirror which bends the optical path of the first light beam to direct the first light beam to the first optical path; and a ½ wavelength plate located adjacent to said beam splitter for rotating the polarization plane of the first light beam to align it with the polarization plane of the second light beam.

19. A projector according to claim 18, wherein said ½ wavelength plate is formed on a light splitting surface of said polarization beam splitter.

20. A projector according to claim 18, wherein said optical system includes a color decomposing system arranged in a main optical path composed of the first and second optical paths, said color decomposing system decomposing the first and second light beams into a red light, a green light and a blue light, said generator includes a first liquid crystal device which modulates the red light to generate a red picture image, a second liquid crystal device which modulates the green light to generate a green picture image, and a third liquid crystal device which modulates the blue light to generate a blue picture image, and said projection optical system receives the red, green and blue lights from said generator to project the red, green and blue picture images.

21. A projector, comprising:
a radiation source for emitting light;
a polarization optical system having a splitter which splits the light from said radiation source into first and second light beams having their respective polarization planes mutually crossing at right angles and directs the first and second light beams to first and second light paths different from a path of the light from said radiation source, and a polarization plane rotator located in the first optical path for rotating the polarization plane of the first light beam to align the polarization plane of the first light beam with the polarization plane of the second light beam;
a color decomposing system which decomposes the polarized light from the optical system into red light, green light and blue light;
a first generator which modulates the red light to generate a red picture image;
a second generator which modulates the green light to generate a green picture image;
a third generator which modulates the blue light to generate a blue picture image; and
a projection optical system which receives the red, green and blue lights from the first, second and third generators, respectively, and projects the red, green and blue picture images.

22. A projector according to claim 21, wherein said first, second and third generators each have a liquid crystal device having a plurality of picture elements.

23. A projector according to claim 22, wherein said projection optical system comprises:
a color synthesizing system including a plurality of dichroic mirrors synthesizing the red light, green light and blue light from said first, second and third generators, respectively; and
a projection lens system which projects the red, green and blue picture images of the red, green and blue lights, respectively, from said color synthesizing system.

24. A projector according to claim 21, wherein said polarization optical system forms a polarized light in which the first and second light beams are parallel.

25. A projector according to claim 24, wherein said polarization optical system converts the light from said radiation source into parallel light and splits the light into the first and second light beams.

26. A projector, comprising:
a radiation source for emitting light;
an illumination system having a first optical arrangement including a plurality of dichroic mirrors, said first optical arrangement decomposing the light from said radiation source into red light, green light and blue light;
a first generator which modulates the red light to generate a red picture image;
a second generator which modulates the green light to generate a green picture image;
a third generator which modulates the blue light to generate a blue picture image;
a projection optical system including a second optical arrangement having a plurality of dichroic mirrors for synthesizing the red, green and blue lights from said first, second and third generators, respectively, through which said second optical arrangement the red, green and blue picture images are projected, with two of the red, green and blue lights transmitting through only one dichroic mirror of the first and second optical arrangements and being reflected by the other dichroic mirrors.

27. A projector according to claim 26, wherein said first, second and third generators each have a liquid crystal device having a plurality of picture elements.

28. A projector according to claim 27, wherein said projection optical system has a projection lens system which projects the red, green and blue picture images of the red, green and blue lights from said second optical arrangement.

29. A projector according to claim 27, wherein said illumination system includes a polarization conversion system which splits the light from said radiation source into first and second light beams having their respective polarization planes mutually crossing at right angles, aligns the polarization plane of the first and second light beams, and directs the first and second light beams to a first optical path and a second optical path substantially parallel to each other, the first and second light beams being parallel to each other from said polarization conversion system and being directed to said first optical arrangement.

30. A projector according to claim 27, wherein said illumination system has a splitter which splits the light from said radiation source into first and second light beams having their respective polarization planes mutually crossing at right angles and directs the first and second light beams to first and second light paths different from a light path from said radiation source, and a polarization plane rotator, arranged in the first light path to rotate the polarization plane of the first light beam to align it with the polarization plane of the second light beam to form a polarized light beam and direct it to said first optical arrangement.

31. A projector according to claim 27, wherein said illumination system has a light splitting portion which splits the light from said radiation source into first and second light beams having their respective polarization planes mutually crossing at right angles, and a polarization plane rotating portion, arranged adjacent to said light splitting portion, to rotate the polarization plane of the first light beam to align the polarization plane of the first light beam with the polarization plane of the second light beam to form a polarized light and direct it to said first optical arrangement.

32. A projector according to claim 27, wherein said plurality of dichroic mirrors of the first and second optical arrangements are arranged to have their reflection surfaces parallel to each other.

33. A projector according to claim 27, wherein said illumination system has a collimator which converts the light from said radiation source into a parallel light flux and said parallel light flux is decomposed by said first optical arrangement.

34. A light modulating device, comprising:
a radiation source for emitting light;
a polarization optical system having a light splitting portion for splitting the light from said radiation source into first and second light beams having their respective polarization planes mutually crossing at right angles, and a polarization plane rotating portion at least partially in contact with said light splitting portion to rotate the polarization plane of the first light beam to align it with the polarization plane of the second beam; and a light modulator which modulates the intensity of the first and second light beams emitted from said radiation source.

35. A projector, comprising:

a radiation source for emitting light;

a polarization optical system having a light splitting portion which splits the light from said radiation source into first and second light beams having their respective polarization planes mutually crossing each other at right angles, and a polarization plane rotating portion at least partially in contact with said light splitting portion to rotate the polarization plane of the first light beam and align it with the polarization plane of the second light beam;

a generator which modulates the first and second light beams from said radiation source to generate a picture image; and a projection optical system which projects the picture image.

36. A projector comprising:

a light source for emitting light;

a color separation system for separating the light from said light source into a plurality of color lights, said system having a first dichroic film which separates the light from said light source into a first color light and a pair of second and third color lights and a second dichroic film which further separates the pair of second and third lights, and a first generator for generating a first color image by modulating the first color light;

a second generator for generating a second color image by modulating the second color light;

a third generator for generating a third color image by modulating the third color light;

a synthesizing system for synthesizing lights of the first, second and third color images, said synthesizing system having a third dichroic film which synthesizes the first and second color images and a fourth dichroic film which synthesizes the synthesized first and second color image and the third color image; and a projection system for projecting lights of the synthesized first, second and third color images, wherein the first and third dichroic films are formed on a first substrate, and said second and fourth dichroic films are formed on a second substrate.

37. A color separating and synthesizing device, comprising:

a first dichroic film which separates an incident light into a first light and a pair of a second and a third lights;

a second dichroic film which further separates the pair of second and third lights;

a third dichroic film which synthesizes the first light and the second light; and a fourth dichroic film which synthesizes the light of the synthesized first and second lights and the third light, wherein said first and third dichroic films are formed on a first substrate, and said second and fourth dichroic films are formed on a second substrate.

38. A light separating and synthesizing device, comprising:

a separation film which separates an incident light into a plurality of lights; and a synthesizing film which synthesizes the separated plurality of lights, said separation film and said synthesizing film being formed in different zones on a single substrate.

39. A light separating and synthesizing device, comprising:

a separating portion which separates an incident light; and a synthesizing portion which synthesizes the separated plural lights, wherein said separating portion and said synthesizing portion are formed in different zones on a single substrate.

* * * * *

UNITED STATES PATENT AND TRADEMARK OFFICE
CERTIFICATE OF CORRECTION

PATENT NO. : 5,298,986

DATED : March 29, 1994

INVENTOR(S) : Owada et al.

It is certified that error appears in the above-indentified patent and that said Letters Patent is hereby corrected as shown below:

COLUMN 1:

Line 61, "this" should read --the--.

COLUMN 4:

Line 43, "FIG. 4 are used." should read --FIG. 4.--.

COLUMN 5:

Line 19, "and by" should read --and are modulated by-- and "are modu-" should be deleted.
Line 20, "lated" should be deleted.
Line 49, "At" should read --By--.

COLUMN 6:

Line 4, "(twist" should read --(twisted--.

COLUMN 7:

Line 6, "second beam;" should read --second light beam;--.

COLUMN 8:

Line 26, "polarization" should read --polarization plane--.

UNITED STATES PATENT AND TRADEMARK OFFICE
CERTIFICATE OF CORRECTION

PATENT NO. : 5,298,986
DATED : March 29, 1994
INVENTOR(S) : Owada et al.

It is certified that error appears in the above-indentified patent and that said Letters Patent is hereby corrected as shown below:

COLUMN 10:

Line 68, "second beam;" should read --second light beam;--.

COLUMN 12:

Line 1, "image" should read --images--.

Signed and Sealed this

Third Day of January, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,298,986
DATED : March 29, 1994
INVENTOR(S) : Owada et al.

It is certified that error appears in the above-indentified patent and that said Letters Patent is hereby corrected as shown below:

COLUMN 1:

Line 61, "this" should read --the--.
Line 65, "mirror" should read --mirrors--.

COLUMN 4:

Line 43, "FIG. 4 are used." should read --FIG. 4.--.

COLUMN 5:

Line 19, "and by" should read --and are modulated by-- and "are modu-" should be deleted.
Line 20, "lated" should be deleted.
Line 49, "At" should read --By--.

COLUMN 6:

Line 4, "(twist" should read --(twisted--.

COLUMN 7:

Line 6, "second beam;" should read --second light beam;--.

COLUMN 8:

Line 26, "polarization" should read --polarization plane--.

UNITED STATES PATENT AND TRADEMARK OFFICE
CERTIFICATE OF CORRECTION

PATENT NO. : 5,298,986
DATED : March 29, 1994
INVENTOR(S) : Owada et al.

It is certified that error appears in the above-indentified patent and that said Letters Patent is hereby corrected as shown below:

COLUMN 10:

Line 68, "second beam;" should read --second light beam;--.

COLUMN 12:

Line 1, "image" should read --images--.

This certificate supersedes Certificate of Correction issued January 3, 1995.

Signed and Sealed this

First Day of August, 1995

Attest:

BRUCE LEHMAN

Attesting Officer

Commissioner of Patents and Trademarks